(12) United States Patent
Scott et al.

(10) Patent No.: US 7,260,198 B1
(45) Date of Patent: Aug. 21, 2007

(54) SYSTEM AND METHOD FOR DISPLAYING A PARTY PROFILE FOR INCOMING AND OUTGOING CALLS

(75) Inventors: David Scott, Norcross, GA (US); Xiaofeng Gao, Alpharetta, GA (US)

(73) Assignee: AT&T Intellectual Property, Inc., Wilmington, DE (US)

(*) Notice: Subject to any disclaimer, the term of this patent is extended or adjusted under 35 U.S.C. 154(b) by 240 days.

(21) Appl. No.: 10/251,932

(22) Filed: Sep. 20, 2002

(51) Int. Cl.
    *H04M 1/56* (2006.01)
(52) U.S. Cl. .......................... 379/142.17; 379/142.06; 379/142.15
(58) Field of Classification Search ........... 379/142.15, 379/142.06, 142.17, 88.19, 88.2, 88.21, 93.23, 379/93.35; 455/415
    See application file for complete search history.

(56) References Cited

U.S. PATENT DOCUMENTS

| | | | | |
|---|---|---|---|---|
| 5,546,447 A | * | 8/1996 | Skarbo et al. ......... | 379/142.05 |
| 5,754,636 A | * | 5/1998 | Bayless et al. ......... | 379/142.1 |
| 5,930,700 A | * | 7/1999 | Pepper et al. ........... | 455/435.3 |
| 6,728,355 B2 | * | 4/2004 | Kowalski ............... | 379/142.06 |
| 2003/0147518 A1 | * | 8/2003 | Albal et al. ............ | 379/207.15 |
| 2004/0063445 A1 | * | 4/2004 | Vaananen ................. | 455/466 |

* cited by examiner

*Primary Examiner*—Barry Taylor
(74) *Attorney, Agent, or Firm*—Merchant & Gould

(57) ABSTRACT

This specification relates to a method for providing information about a caller before the call is completed. The invention comprises a method for intercepting a telephone number from a phone line or phone system, searching a database for information associated with that phone number and displaying the information on a computer screen, such that a person may see the information before the phone is answered. This provides immediate access to information related to an incoming or outgoing call to an individual without the need to manually search for the file.

12 Claims, 5 Drawing Sheets

SYSTEM AND METHOD FOR DISPLAYING A PARTY PROFILE FOR INCOMING AND OUTGOING CALLS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF INVENTION

The present invention generally relates to displaying information about a telephone call concurrently with the call. More particularly, this invention relates to displaying information about a phone call based on the interception and association of a phone number with a file in a database.

BACKGROUND

It is often convenient and helpful to know the identity of a caller before one answers the phone. This allows a person to optimize their time by not answering calls from telemarketers or unknown callers, while only answering calls they are expecting or are otherwise important to them. Caller identification systems, where the number and sometimes name of a caller are displayed on the telephone or on a small display screen near the phone, allow the identity of a caller to be ascertained before answering.

However, conventional caller identification units do not display information other than a party's name and phone number. Furthermore, if the number is from out of the area often only the phone number is displayed without the caller's name. There is often a need to have more information than is displayed through a caller identification system, and to have the information organized in a user-friendly manner. It would, therefore, be desirable to have more information associated with the caller available at the time the phone is answered.

One solution to this problem used by many in a business setting is to answer the phone while simultaneously reviewing one's notes, either on a Rolodex™ or computerized database, to retrieve further information about the caller. For example, if a salesperson is receiving a call from a customer, he may look for notes regarding the customer's past purchases, present orders and other such information while talking with the caller. Whether computerized databases or hand written notes are used, this process is time consuming and the caller may feel that they are not being well served by a salesperson who does not initially remember them. If the information were immediately available to the salesperson, the caller would not have to wait while their information was located.

Currently some businesses use a system in which a call comes in and the number of the incoming call is matched against phone numbers in a database. If a matching phone number is located, information associated with that number is displayed on a screen in front of the operator who answers the call. This system is often employed in call centers where a customer calls with regard to a product or service and their information is displayed in front of the operator as a reference during the call. The customer data is held in a central database for the company. The operators do not keep separate profiles for the callers or have continued contact with the caller. The information is displayed for the duration of the call and may be added to, but only for reference during subsequent calls. This system does not allow caller profiles based on personal contact between the operator and the caller. Furthermore, the operator has no control over what numbers are listed in the database and for which numbers contact information is provided. These systems are also limited to businesses and cannot be employed by persons at home or by those who are not connected to the central computer containing the database of customer information.

It would, therefore, be useful to have information about a caller automatically retrieved from a personal database and displayed on a personal computer screen when the phone begins to ring. This would enable a person to view information about the caller before the phone is answered.

SUMMARY

Embodiments of the present invention relate to a system and method for displaying call information comprising the steps of intercepting a telephone number associated with a phone call, transmitting the telephone number to a personal computer, searching a database on the personal computer for a corresponding party profile, and displaying the party profile on the personal computer's monitor.

This method provides quick access to records that one would need while on the phone with a caller. The method of the present invention automatically displays information about the other party to the call on the user's computer screen whenever a call is placed or received from the user's phone.

DETAILED DESCRIPTION

Embodiments of the present invention provide systems and methods for displaying information about a party during a telephone call. When a call is placed or received from a users phone, the phone number associated with the call is intercepted and transmitted to the user's computer where it is searched against a database and if a matching party profile is found, the party profile is displayed on the user's computer screen.

Embodiments of the present invention relate to systems and methods for intercepting a telephone number associated with a call, transmitting the number to a computer or computer system, searching a database for a matching party profile associated with the phone number and displaying that party profile on a computer screen in front of the user.

As used in this specification a "user" is the person for whom the party profile is displayed. Calls placed to or from the user's phone are identified by information displayed on the user's computer screen after a search of the user's database of contact information.

For the purposes of this patent, "party profile" refers to any information available that is associated with a particular phone number. As an example only and by no means by way of limitation, a party profile may contain a name, address, title, company name, phone numbers, fax numbers, email addresses, as well as information pertinent to a particular business such as sales records, order information, or any other information a user desires to associate with the number.

The several embodiments of the present invention may be employed on a variety of different systems, but generally a telephone functionally connected to a computer will be required. The telephone may be part of a telephone system, for example in a large business with a PBX system. The computer may also be part of a computer network. In embodiments wherein a telephone or computer network are employed, the phone or phone network is connected to the computer or computer network such that relevant information regarding the telephone call may be transmitted from one to the other.

In an embodiment of the present invention, the first step is the interception of a telephone number associated with either an incoming or outgoing call. When a telephone call is placed, data is sent from the phone, through the phone system to the telecommunications provider. A router then uses this information to route the call to the called party. During this process the data comprises at least the numbers of both the calling party as well as the number of the called party. Depending on whether the call is incoming or outgoing the appropriate number is intercepted from this initial data stream at the beginning of a call for the purposes of the present invention.

Figure 1:
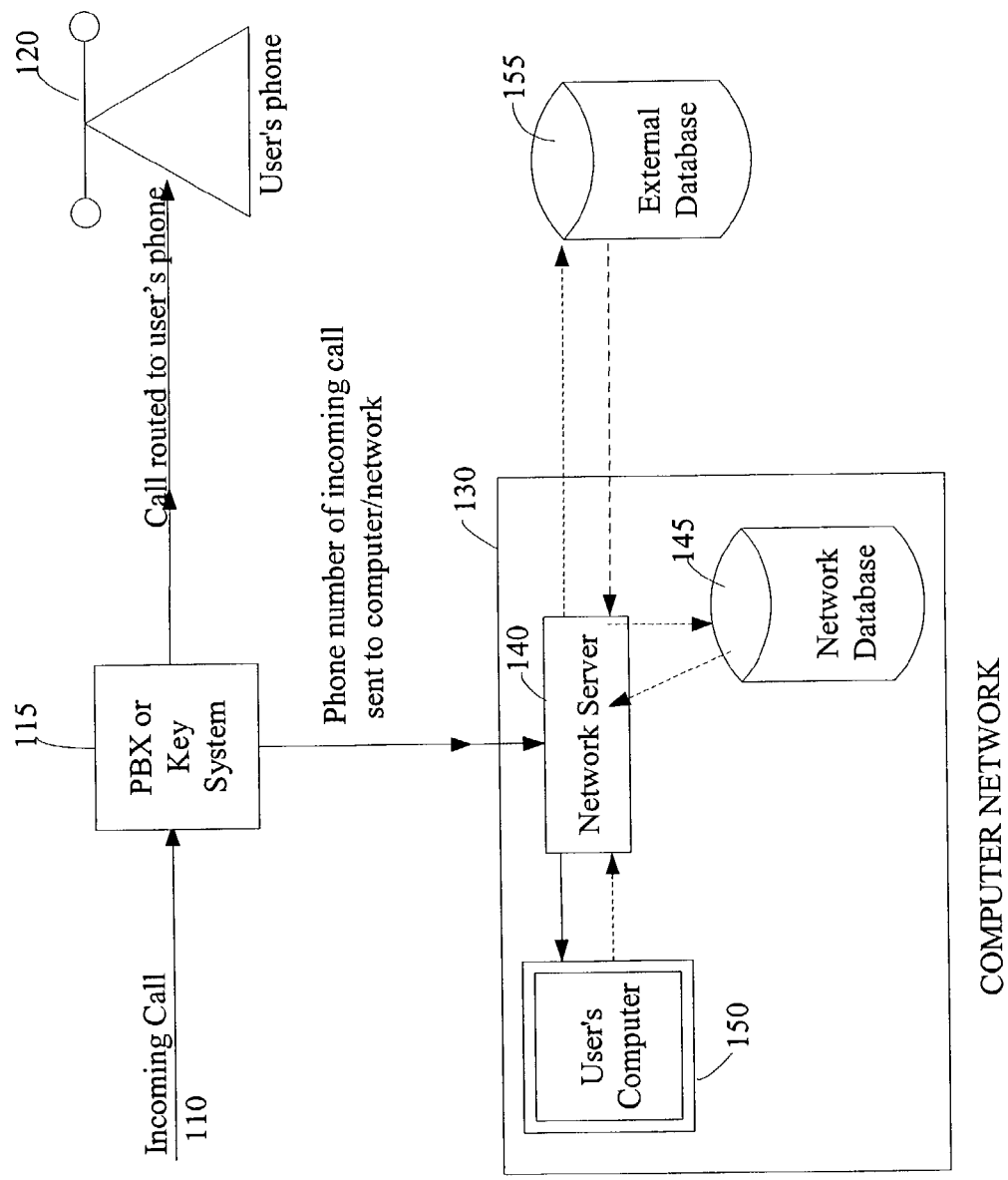
FIG. 1 is a schematic of a system used in an embodiment of the present invention.
Figure 2:
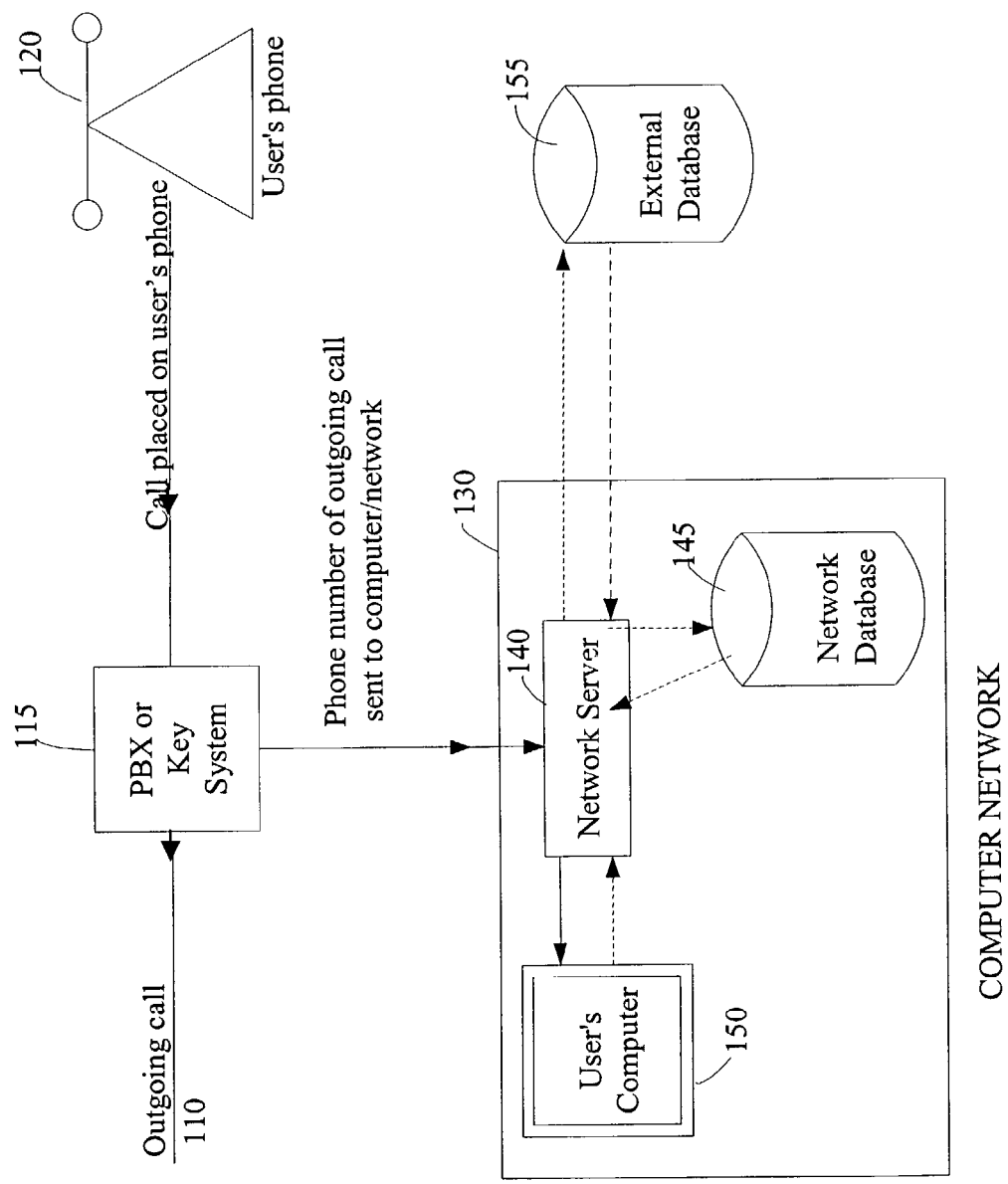
FIG. 2 is a schematic of a system used in an embodiment of the present invention.

Referring to FIGS. 1 and 2, in an embodiment of the present invention where the user is in an office with both phone and computer networks, an incoming call 110 will enter through the phone system 115, which may be a PBX, Key system or other such private networked phone system. The server running the phone system 115 will extract the number of the calling party and transmit the number to the user's computer 150. In an embodiment where a computer network 130 exists, the phone server 115 sends the number to the computer server 140 which then routes the call to the user's computer 150. The phone system 115 then continues routing the call to the user's phone 120.

Once the user's computer receives the phone number, the computer searches its databases for a matching party profile. A party profile is a database file or other collection of information which is associated with a particular phone number. For example the party profile may contain, a name, address, phone, fax and email information as well as any other information a user wishes to associate with a phone number. The preferred database to search for a party profile would be a pre-existing contacts list such as Microsoft Outlook®. If no match is found on the user's computer 150, the computer may search other databases on the network 145, or databases outside the network 155. Once a matching party profile is located, it is displayed on the user's computer screen. In a preferred embodiment of the present invention, the party profile is displayed in a pop-up window so as not to interfere with any presently running applications on the user's computer.

Figure 3:
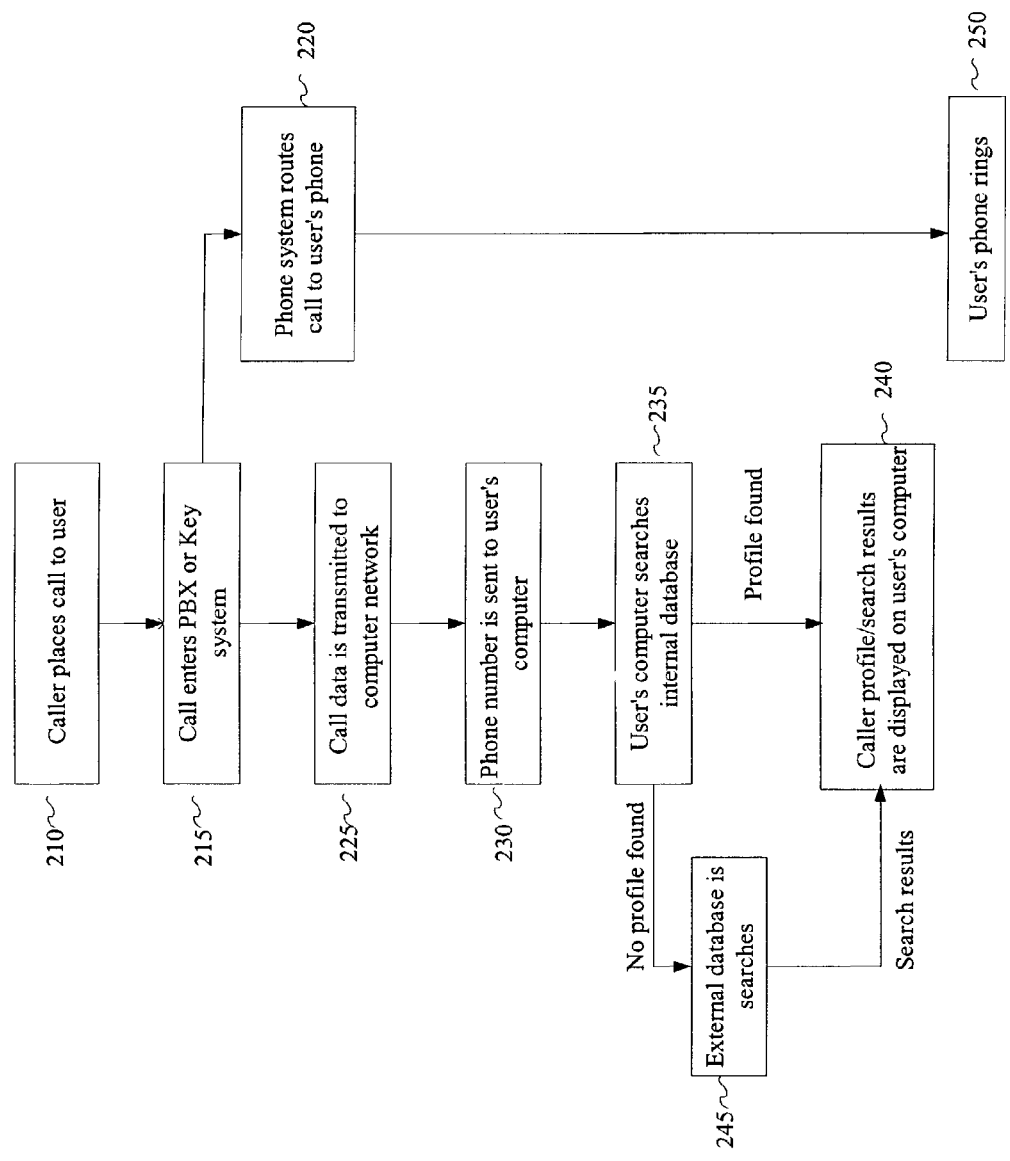
FIG. 3 is a flowchart of the process of an embodiment of the present invention.

FIG. 3 shows a flowchart for a method of the present invention. A caller places a call to the user 210. The call is routed by the phone company to the user, which in one embodiment is a PBX, Key or other such private network phone system 215. The phone system routes the call to the user's phone 220, while also transmitting the telephone number to the computer network 225. The computer network 225 sends the phone number to the user's computer 230. The users computer then searches its databases for a matching party profile 235. If a matching party profile is found, the profile is displayed on the users computer 240. If a matching profiles not found on the user's computer, an external database 245 may be searched and the results then displayed on the user's computer 240. The external database 245 may be another database on the computer network, or it may be a database accessible through the Internet.

In some embodiments, there is no party profile available or there may not be a number associated with a phone call, for example when someone calls the user from a private number. In these instances a message is displayed informing the user that the number is of unknown or unidentifiable origin.

In another embodiment of the present invention, once a party profile is located, some but not all of the information contained therein is displayed. Depending on the needs of the user, only certain types of information may be needed during a routine phone call and, as such, only this information will be displayed.

In an embodiment of the present invention where a party profile cannot be located in the user's computer's database, an external search is performed. If the user's computer is connected to other computers in a network, such as in a corporate computer network, any other database on the network may be searched. This would enable a user to receive a party profile for someone they had never talked to before and allow user's to share contact information for callers across a computer network.

This is particularly beneficial in a setting where a caller calls more than once, but does not necessarily speak with the same individual. In this embodiment, all the information relating to the caller's prior calls, would be associated with their number and displayed on the screen of the user's computer.

In a still further embodiment, the number may be matched with a party profile through an external connection to the Internet. Particularly where no party profile is available on the user's computer, it would be helpful to have some information about the caller. Once the user's computer has searched its internal databases, it will search external databases for matching party profiles. There are a number of publicly accessible information sources on the Internet, such as "reverse directories", where a name and address may be provided based on phone records. This information may then be displayed such that there is at least some information displayed for each call.

FIG. 2 represents an embodiment of the present invention in which a party profile is displayed for outgoing calls. This embodiment is almost identical to the embodiment for incoming calls except the call is placed through the user's phone 120. Then, before the call is completed the number is intercepted and sent to the user's computer in the same manner as discussed above. In a corporate system with a computer and telephone network, the call is routed through the PBX or Key system 115 before leaving the private network. At this point the phone server sends the number to the computer network 130, while at the same time completing the call by sending it on to the telecommunications provider where the call is routed through standard telecommunications lines 110. The user's computer manages the search and display of the party profile in the same manner as for an incoming call.

In a further embodiment of the present invention, the computer or computer network 130 sends a signal to the phone 120 or phone system 115 to pause the completion of the call until a party profile is found. The computer presents the user with a pop-up button, or other similar input means, allowing the user to complete the call only when the button is clicked. This will give the user as much time as needed to read the information in the party profile before completing the call. Alternatively, the phone call is connected immediately upon dialing without a pause while the computer searches for and displays the party profile.

Figure 4:
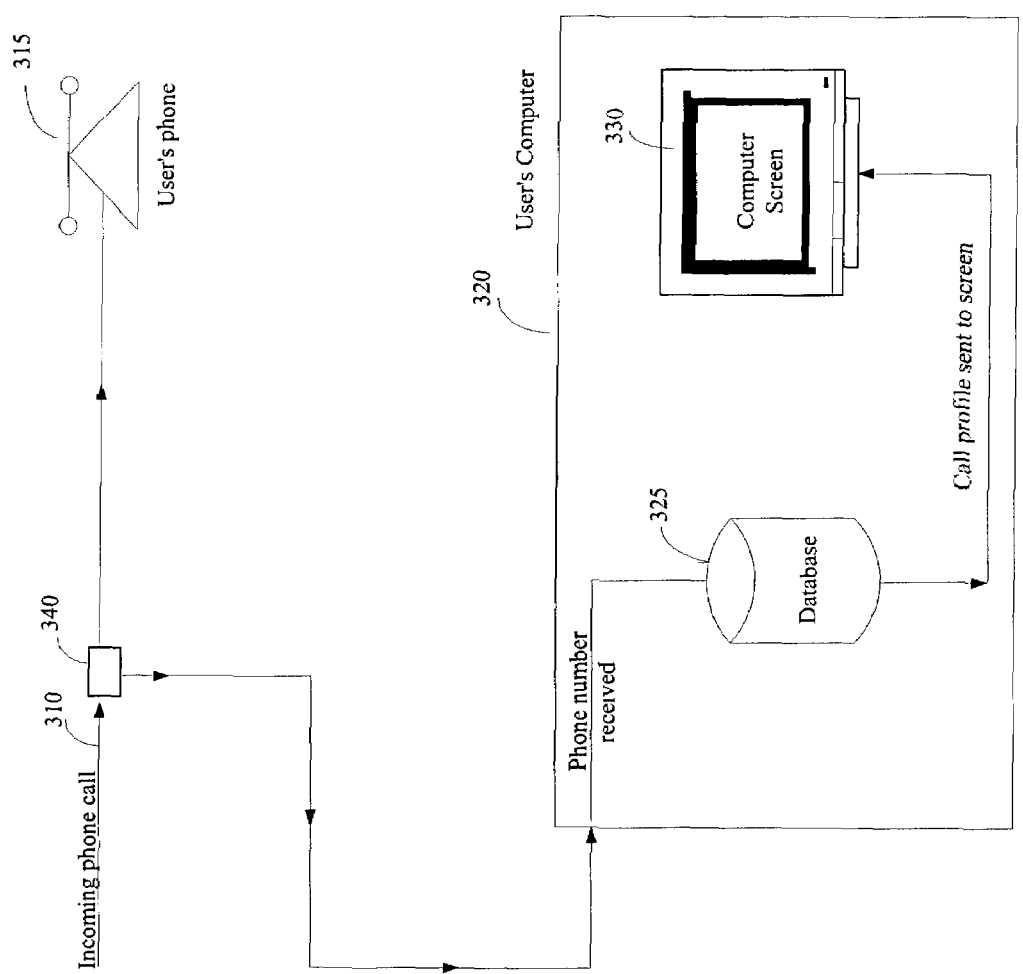
FIG. 4 is a schematic of a system used in an embodiment of the present invention.

FIG. 4 shows a further embodiment of the present invention comprising a computer 320 and phone 315 which are not part of a computer or telephone network. The incoming call 310 proceeds to the user's phone 315 while the computer 320 intercepts the number of the caller. The computer 320 is functionally connected to the telephone line, for example via a modem 340. Through this connection, the computer receives the data associated with the phone call and extracts the number. Once the computer 320 intercepts the number, it searches its internal database 325 as described in other embodiments of this invention. When a party profile is located, the computer 320 displays the party profile on the computer screen 330.

Figure 5:
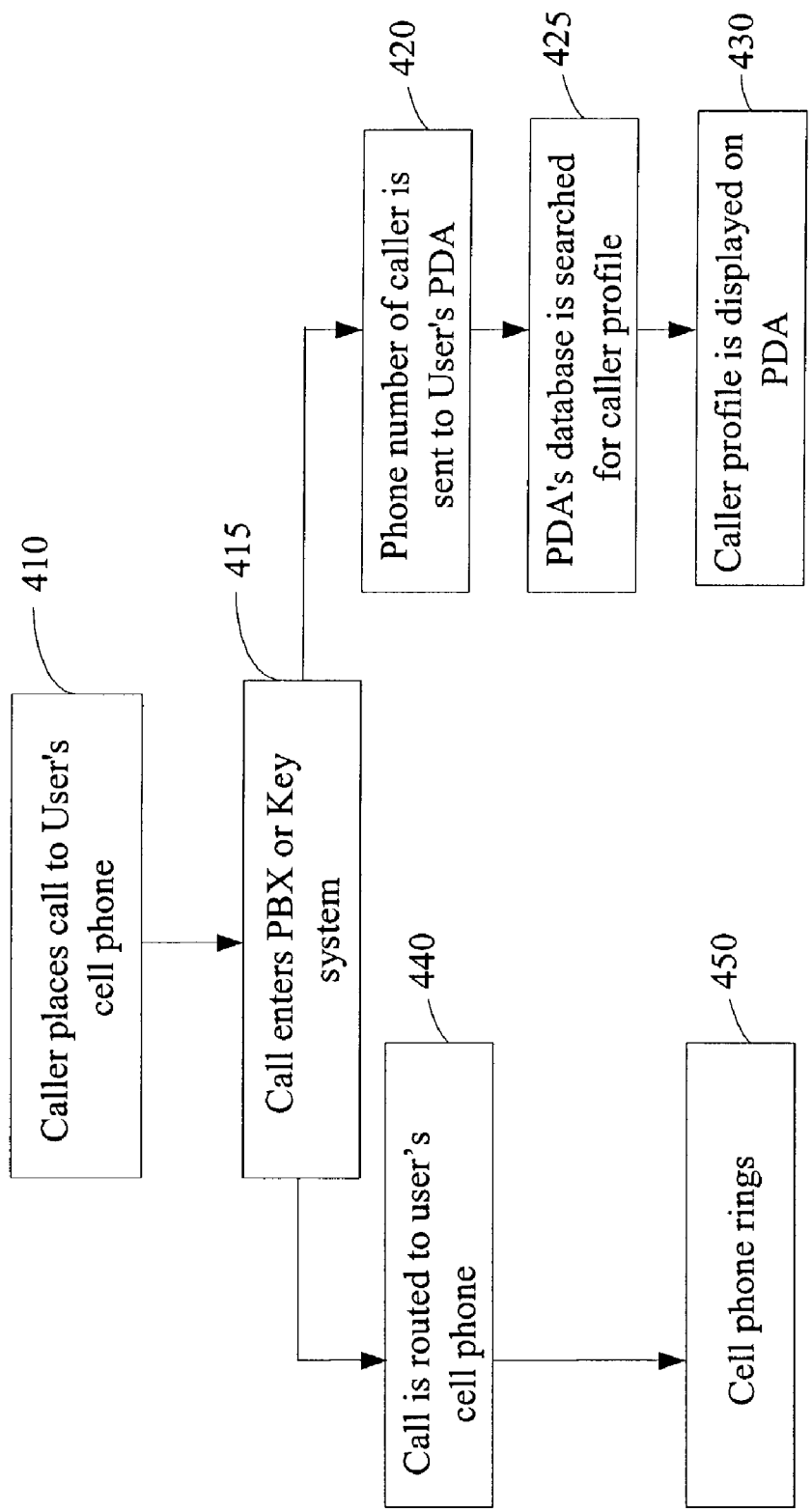
FIG. 5 is a flowchart of a system used in an embodiment of the present invention.

FIG. 5 shows a flowchart of another embodiment of the present invention wherein the call is placed or received by a user with a cellular phone and a personal digital assistant (PDA). Any wireless device may be employed with this embodiment of the invention. PDA's are mentioned specifically as one example of such a device, but are not meant to be limiting.

A caller places a call to the user's cell phone 410. The call is routed to the cellular network 415 where the call is transmitted to the user's cell phone 440 and the phone number is transmitted to the user's PDA 420. The PDA 420 searches its database for the caller profile 425 and if one is found, the profile is displayed on the PDA 430. This embodiment allows a user who is away from their desk and computer to have the same or similar access to information about a caller through their PDA. Various other embodiments of the cell phone and PDA embodiments will be readily apparent to those skilled in the art.

The foregoing descriptions of the preferred embodiments of the invention have been presented for the purpose of illustration and description and are not intended to be exhaustive or to limit the invention to the precise forms disclosed. Numerous modifications and adaptations thereof will be apparent to those skilled in the art without departing from the spirit and scope of the present invention.

We claim:

1. A method for displaying call information, comprising:
   in response to placing a phone call from a calling party to a telephone number associated with a called party on a private telephone network of the calling party, intercepting the telephone number associated with the called party of the phone call;
   transmitting the intercepted telephone number to a computer network functionally connected to the private telephone network of the calling party;
   searching a first database operatively associated with a computer of the calling party and functionally connecting to the private telephone network for a telephone number to match the telephone number of the called party, for a corresponding called party profile associated with the telephone number of the called party;
   if the search of the first database fails to provide a matching telephone number of the called party, then searching for a matching telephone number on at least one other database operatively associated with the computer network, for a corresponding called party profile; and,
   displaying, on the computer of the calling party, the called party profile located in either search.

2. The method of claim 1 wherein the party profile on the first database comprises information previously provided by the called party to the first database.

3. The method of claim 1, wherein the telephone number is matched against party profiles stored in a central database connected to the computer network.

4. The method of claim 1, wherein the telephone number is matched against party profiles in a database external to the computer network.

5. The method of claim 1, wherein the party profile is displayed on a screen of the computer of the calling party functionally connected to the computer network.

6. The method of claim 5, wherein the party profile is displayed in a popup window on the screen of the computer.

7. The method of claim 1, wherein the party profile is displayed on a personal digital assistant (PDA) device.

8. A computer-readable medium having stored thereon instructions which, when executed by a processor, cause the processor to:
   intercept a telephone number associated with a phone call to a called party, in response to placing the phone call by a calling party at a private telephone network of the calling party;
   transmit the telephone number to a computer of the calling party;
   search a first database operatively associated with the computer for a corresponding party profile associated with the telephone number associated with the called party;
   search at least one other database for a corresponding party profile if no profile is located in the first database; and
   display the party profile located in either search, on a computing apparatus of the calling party.

9. A system for displaying call information, the system comprising:
   means for intercepting a telephone number associated with a phone call to a called party, in response to placing the phone call from a calling party on a private telephone network;
   means for transmitting the intercepted telephone number to a computer of the calling party;
   means responsive to the intercepted telephone number for searching a first database for a party profile corresponding to the telephone number, the first database being functionally associated with the computer of the calling party identified in response to the telephone number, and, if no corresponding party profile is found, then searching at least one other database functionally associated with a computer other than the computer of the calling party for a party profile corresponding to the telephone number; and
   means for displaying a party profile located in either search.

10. A method for displaying call information, comprising:
   intercepting a telephone number associated with a phone call outgoing from a user to a called party, in response to placement of the phone call by the user;
   transmitting the telephone number to a computer of that user;
   using the computer to search a first database associated with the computer for a party profile corresponding to the telephone number of the called party;
   if no corresponding telephone number is found in the search of the computer, then searching for a corresponding telephone number of the called party on a database of at least one other computer; and displaying the party profile to the user.

11. The method of claim 10, wherein the party profile in at least the first database comprises information provided by the user to a database.

12. A method for displaying call information, comprising:

in response to placing a phone call from a calling party to a telephone number associated with a called party on a private telephone network of the calling party, intercepting the telephone number associated with the called party of the phone call;

transmitting the intercepted telephone number to a computer network functionally connected to the private telephone network of the calling party;

searching a first database operatively associated with a computer of the calling party and functionally connecting to the private telephone network for a telephone number to match the telephone number of the called party, for a corresponding called party profile associated with the telephone number of the called party;

if the search of the first database fails to provide a matching telephone number of the called party, then searching for a matching telephone number on at least one other database operatively associated with the computer network, for a corresponding called party profile;

displaying, on the computer of the calling party, the called party profile located in either search;

pausing completion of the call to the called party during the search for a calling-party profile;

presenting, on the computer of the calling party, an indication to the calling party when the call is paused; and completing the paused call in response to an input from the calling party.

\* \* \* \* \*